US010691810B1

(12) United States Patent
Freitag et al.

(10) Patent No.: US 10,691,810 B1
(45) Date of Patent: Jun. 23, 2020

(54) DETECTING VULNERABILITIES ASSOCIATED WITH A SOFTWARE APPLICATION BUILD

(71) Applicant: FMR LLC, Boston, MA (US)

(72) Inventors: Jon Augustine Freitag, Chapel Hill, NC (US); Joseph Scott Yarman, Holly Springs, NC (US); Stuart Te-Hui Shih, Raleigh, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/572,405

(22) Filed: Sep. 16, 2019

(51) Int. Cl.
*G06F 21/57* (2013.01)
*G06F 21/54* (2013.01)
*G06F 8/71* (2018.01)
*G06F 8/65* (2018.01)

(52) U.S. Cl.
CPC .............. *G06F 21/577* (2013.01); *G06F 8/65* (2013.01); *G06F 8/71* (2013.01); *G06F 21/54* (2013.01); *G06F 2221/033* (2013.01)

(58) Field of Classification Search
CPC . G06F 21/577; G06F 8/65; G06F 8/71; G06F 21/54; G06F 2221/033
See application file for complete search history.

(56) References Cited

U.S. PATENT DOCUMENTS

| 7,596,782 | B2* | 9/2009 | Ebbo | G06F 8/71 717/114 |
| 7,975,306 | B2* | 7/2011 | Chess | G06F 21/54 713/188 |
| 8,949,788 | B2* | 2/2015 | Bonnet | G06F 8/36 715/763 |
| 10,032,031 | B1* | 7/2018 | Sharifi Mehr | G06F 21/577 |

(Continued)

OTHER PUBLICATIONS

Sohr, Karsten, Tanveer Mustafa, and Adrian Nowak. "Software security aspects of Java-based mobile phones." Proceedings of the 2011 ACM Symposium on Applied Computing. ACM, 2011. (Year: 2011).*

Simic, Bojan & Walden, James, "Eliminating SQL Injection and Cross Site Scripting Using Aspect Oriented Programming," Engineering Secure Software and Systems: 5th International Symposium (ESSoS) 2013, Paris, France, pp. 213-228 (Year: 2013).*

S. S. Alqahtani, E. E. Eghan and J. Rilling, "SV-AF—A Security Vulnerability Analysis Framework," 2016 IEEE 27th International Symposium on Software Reliability Engineering (ISSRE), Ottawa, ON, 2016, pp. 219-229. (Year: 2016).*

(Continued)

*Primary Examiner* — Jung W Kim
*Assistant Examiner* — Sameera Wickramasuriya
(74) *Attorney, Agent, or Firm* — Proskauer Rose LLP

(57) ABSTRACT

Methods and apparatuses are described for detecting vulnerabilities associated with a software application build. A server generates a software application build based upon a source code repository, including determining application dependencies of the software application build. The server identifies vulnerabilities associated with the application dependencies. For each identified vulnerability, the server creates an aspect class based upon a package file associated with the vulnerability, the aspect class comprising vulnerability logging code. The server integrates the created aspect classes into libraries of the application dependencies, generates a new package file based upon the application dependencies, and integrates the new package file into the software application build. The server executes the software application build, including generating log statements by calling the aspect classes in the new package file. The server analyzes the log statements to determine which of the identified vulnerabilities were invoked during execution of the software application build.

26 Claims, 4 Drawing Sheets

(56) References Cited

U.S. PATENT DOCUMENTS

| | | | |
|---|---|---|---|
| 10,049,030 B2* | 8/2018 | Shukla | G06F 11/3668 |
| 10,055,576 B2 | 8/2018 | Milner et al. | |
| 2007/0074169 A1* | 3/2007 | Chess | G06F 21/54 |
| | | | 717/126 |
| 2007/0106980 A1* | 5/2007 | Felts | G06F 8/65 |
| | | | 717/124 |
| 2007/0168940 A1* | 7/2007 | Lunawat | G06F 8/71 |
| | | | 717/108 |
| 2010/0175044 A1* | 7/2010 | Doddavula | G06F 8/38 |
| | | | 717/104 |
| 2013/0152047 A1* | 6/2013 | Moorthi | G06F 11/3664 |
| | | | 717/124 |
| 2014/0047545 A1* | 2/2014 | Sidagni | G06F 21/577 |
| | | | 726/25 |
| 2014/0201573 A1* | 7/2014 | Huang | G06F 11/362 |
| | | | 714/38.1 |
| 2014/0208430 A1* | 7/2014 | Guarnieri | G06F 21/52 |
| | | | 726/25 |
| 2015/0040229 A1* | 2/2015 | Chan | G06F 21/577 |
| | | | 726/25 |
| 2016/0246963 A1* | 8/2016 | Sheth | G06F 21/565 |
| 2017/0169229 A1* | 6/2017 | Brucker | G06F 21/577 |
| 2018/0165072 A1* | 6/2018 | Fink | G06F 8/40 |
| 2019/0205542 A1* | 7/2019 | Kao | G06F 8/70 |
| 2019/0294536 A1* | 9/2019 | Avisror | G06F 8/60 |

OTHER PUBLICATIONS

Simic, Bojan & Walden, James, "Eliminating SQL Injection and Cross Site Scripting Using Aspect Oriented Programming," Engineering Secure Software and Systems: 5th International Symposium (ESSoS) 2013, Paris, France, pp. 213-228.

* cited by examiner

```
public class LogAroundAspect {

@Aspect
public class LogAroundAspect {
    @Around("execution(* org.springframework.web.servlet.*(..))")
    public void logAroundAllMethods(ProceedingJoinPoint joinPoint) {
        WriteToLogFile("LogAroundAspect.logAroundAllMethods() : " +
joinPoint.getSignature().getName());
    }
}
```

DETECTING VULNERABILITIES ASSOCIATED WITH A SOFTWARE APPLICATION BUILD

TECHNICAL FIELD

This application relates generally to methods and apparatuses, including computer program products, for detecting vulnerabilities associated with a software application build.

BACKGROUND

Platforms like GitHub (github.com) and GitLab (about.gitlab.com) enable seamless, dynamic collaboration between large and geographically-diverse development teams to build software applications more efficiently than in the past. And, due to the flexibility, re-usability, and cost of open source and/or third-party software modules and libraries, developers now frequently incorporate such software into their applications, either directly or as application dependencies—and many of these modules and libraries are publicly available for download and use without restriction.

However, an inherent risk in using open source or third-party software is the potential existence of vulnerabilities in the code that could significantly compromise the security and integrity of the overall software application. Often, the origination of the third-party software can be challenging to determine. In addition, any potential or actual vulnerabilities may not immediately apparent, going undetected for weeks or months after the related source code has been integrated into a production software application build. Inclusion of these vulnerabilities in a live application could result in malicious actors gaining unauthorized access to backend systems, performing unauthorized functions or transactions, or otherwise negatively impacting the stability and/or security of the software application itself or other enterprise computing systems that the application utilizes or with which the application communicates. Therefore, it is important for software application developers to understand whether any vulnerabilities exist in the open source or third-party modules used by the application to eliminate or minimize the risk of releasing an application that is vulnerable.

Another consideration that developers face is whether the code, libraries, or functions associated with identified vulnerabilities are actually called by the software application during execution, and if so, which application modules rely on or execute the vulnerabilities. Generally, in complex software applications, it can be difficult to track all of the particular invocations of certain application dependencies (such as packages, classes, methods and the like)—particularly when considering the wide variety of use cases that may be applied to the software application during typical use and the number of developers that may write code for the application. It can be a waste of time and resources to allow developers to integrate open source or third-party software into an application build, only to realize after the fact that the integrated software includes show-stopping vulnerabilities.

SUMMARY

Therefore, what is needed are methods and systems that enable the detection of vulnerabilities associated with a software application build during a development and testing phase of the related software application. The techniques described herein provide the advantage of automatically identifying specific vulnerabilities present in application dependencies and modifying the application build to generate actionable log statements when the code that contains the vulnerabilities is executed during a test, so that the vulnerabilities can be verified and remediated.

The invention, in one aspect, features a system for detecting vulnerabilities associated with a software application build. The system comprises a server computing device with a memory for storing computer-executable instructions and a processor that executes the computer-executable instructions. The server computing device generates a software application build based upon a source code repository, including determining one or more application dependencies of the software application build. The server computing device identifies one or more vulnerabilities associated with the one or more application dependencies. For each identified vulnerability, the server computing device creates an aspect class based upon a package file associated with the vulnerability, the aspect class comprising vulnerability logging code. The server computing device integrates the created aspect classes into one or more libraries of the one or more application dependencies. The server computing device generates a new package file for each of at least one of the one or more application dependencies. The server computing device integrates the new package files into the software application build. The server computing device executes the software application build, including generating one or more log statements by calling one or more of the aspect classes in the new package files. The server computing device analyzes the one or more log statements generated by the one or more aspect classes to determine which of the identified vulnerabilities were invoked during execution of the software application build.

The invention, in another aspect, features a computerized method of detecting vulnerabilities associated with a software application build. A server computing device generates a software application build based upon a source code repository, including determining one or more application dependencies of the software application build. The server computing device identifies one or more vulnerabilities associated with the one or more application dependencies. For each identified vulnerability, the server computing device creates an aspect class based upon a package file associated with the vulnerability, the aspect class comprising vulnerability logging code. The server computing device integrates the created aspect classes into one or more libraries of the one or more application dependencies. The server computing device generates a new package file for each of at least one of the one or more application dependencies. The server computing device integrates the new package file into the software application build. The server computing device executes the software application build, including generating one or more log statements by calling one or more of the aspect classes in the new package file. The server computing device analyzes the one or more log statements generated by the one or more aspect classes to determine which of the identified vulnerabilities were invoked during execution of the software application build.

Any of the above aspects can include one or more of the following features. In some embodiments, the software application build is a Java™ application build. In some embodiments, determining one or more application dependencies of the software application build comprises storing the determined application dependencies in an output file. In some embodiments, the one or more application dependencies are Java™ Archive (JAR) files. In some embodiments, the identified one or more vulnerabilities comprise a file name of a JAR file, a Java™ class name, a Java™ method name, or any combination thereof.

In some embodiments, identifying one or more vulnerabilities associated with the one or more application dependencies comprises accessing a remote database to retrieve an identity of one or more of the vulnerabilities. In some embodiments, the server computing device stores data associated with the identified vulnerabilities in a local data store. In some embodiments, the aspect class is a Java™ Aspect class and the vulnerability logging code is Advice code. In some embodiments, the Advice code includes one or more pointcut expressions that each generates a log statement comprising a package name and a method name that contain the Advice code.

In some embodiments, the new package file is a JAR file that includes the created aspect classes. In some embodiments, integrating the new package file into the software application build comprises: modifying a build configuration file of the software application build to include the new package file as a dependency to the software application build; and re-running the software application build using the modified build configuration file to generate an updated software application build that includes the new package file.

In some embodiments, when the server computing device executes the software application build, the generated one or more log statements are transmitted to a remote computing device, which analyzes the one or more log statements generated by the one or more aspect classes. In some embodiments, the remote computing device generates one or more vulnerability warning messages based upon the analysis of the one or more log statements and transmits the vulnerability warning messages to a user device. In some embodiments, the remote computing device generates a vulnerability remediation ticket in a software application development system based upon the analysis of the one or more log statements.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is an exemplary Aspect class generated by the system to log execution of software application functionality.

DETAILED DESCRIPTION

Figure 1:
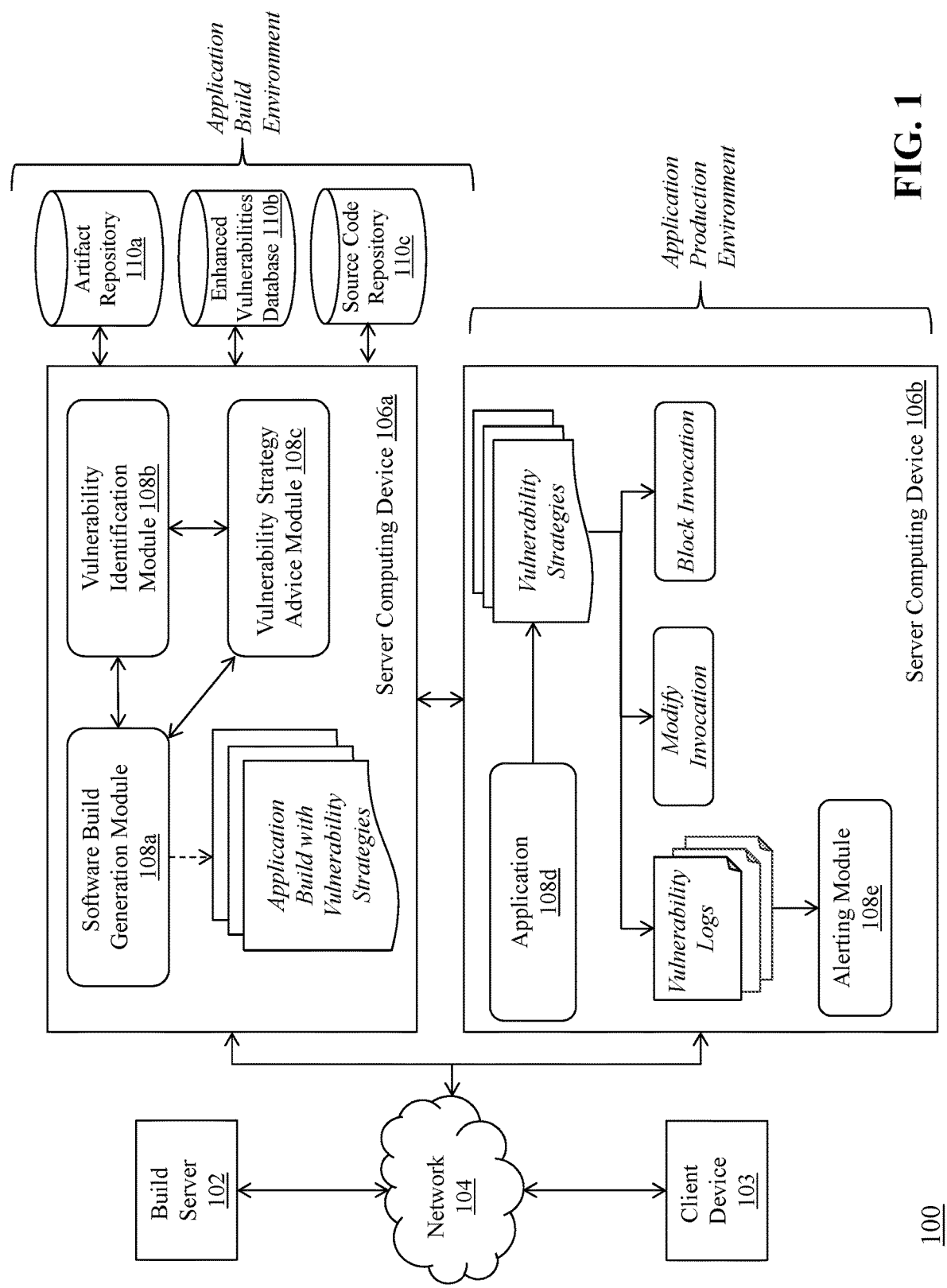
FIG. 1 is a block diagram of a system for detecting vulnerabilities associated with a software application build.

FIG. 1 is a block diagram of a system 100 for detecting vulnerabilities associated with a software application build. The system 100 includes an application build environment that comprises a build server computing device 102, a communications network 104, a server computing device 106a that includes a software build generation module 108a, a vulnerability identification module 108b, and a vulnerability strategy advice module 108c, and a plurality of databases, including an artifact (third party library) repository 110a, an enhanced vulnerabilities database 110b, and a source code repository 110c. The system further includes an application production environment that comprises a client device 103, a communications network 104, an application 108d, and an alerting module 108e.

The build server computing device 102 connects to the communications network 104 in order to communicate with the server computing device 106a to perform functions relating to detecting vulnerabilities associated with a software application build. In some embodiments, the build server 102 is a combination of hardware, including one or more special-purpose processors and one or more physical memory modules, and specialized software modules that are executed by a processor of the build server 102, to receive data from other components of the system 100, transmit data to other components of the system 100, and perform functions for detecting vulnerabilities associated with a software application build as described herein It should be appreciated that other types of computing devices that are capable of connecting to the components of the system 100 can be used without departing from the scope of invention. Although FIG. 1 depicts a single build server 102, it should be appreciated that the system 100 can include any number of build servers. In some embodiments, the build server 102 is associated with a source code change management platform, software application development platform, and/or an issue tracking platform (such as Jira™ from Atlassian, Inc.), and the build server 102 is configured to coordinate with server computing device 106a to generate a software application build as described herein.

The client computing device 103 connects to the communications network 104 in order to communicate with the server computing device 106b to perform functions relating to detecting vulnerabilities associated with a software application build. Exemplary client computing devices 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 103, it should be appreciated that the system 100 can include any number of client computing devices.

The communication network 104 enables the other components of the system 100 to communicate with each other in order to perform the process of detecting vulnerabilities associated with a software application build as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other. In some embodiments, the network that connects the build server 102 to the server computing device 106a is different from the network that connects the client device 103 to the server computing device 106b.

The server computing devices 106a and 106b are each a combination of hardware, including one or more special-purpose processors and one or more physical memory modules, and specialized software modules—such as modules 108a-108c for server 106a, and modules 108d and 108e for server 106b—that are executed by a processor of the respective server computing device 106a or 106b, to receive data from other components of the system 100, transmit data to other components of the system 100, and perform functions for detecting vulnerabilities associated with a software application build as described herein. In some embodiments, the modules 108a-108e are specialized sets of computer software instructions programmed onto a dedicated processor in the respective server computing device 106a or 106b and can include specifically-designated memory locations and/or registers for executing the specialized computer software instructions. Further explanation of the specific processing performed by the modules 108a-108e will be provided below.

Although the modules 108a-108c are shown in FIG. 1 as executing within the same server computing device 106a, and modules 108d and 108e are shown as executing within the same server computing device 106b, in some embodiments the functionality of the modules 108a-108e can be distributed among a plurality of server computing devices. As shown in FIG. 1, the server computing device 106a enables the modules 108a-108c to communicate with each other in order to exchange data for the purpose of performing the described functions, and similarly the server computing device 106b enables the modules 108d and 108e to communicate with each other in order to exchange data for the purpose of performing the described functions. It should be appreciated that any number of computing devices, arranged in a variety of architectures, resources, and configurations (e.g., cluster computing, virtual computing, cloud computing) to perform the functions of the server computing devices 106a and 106b.

The databases 110a-110c comprise transient and/or persistent memory for data storage, that is used in conjunction with detecting vulnerabilities associated with a software application build as described herein. Generally, the databases 110a-110c are configured to receive, generate, and store specific segments of data relating to functions performed by the modules 108a-108c, the server computing device 106a more generally, and/or the build server 102. In some embodiments, all or a portion of the databases 110a-110c can be integrated within the server computing device 106a, or be located on a separate computing device or devices, where the separate devices are in proximity to the server computing device 106a (e.g., connected via cabling or other localized connection) and/or located via remote network connection (e.g., network 104) to the server computing device 106a. In one example, the databases 110a-110c can each comprise a database such as MySQL™ available from Oracle Corp. of Redwood City, Calif. In another example, the databases 110a-110c can be based upon a platform such as Cassandra™ available from The Apache Software Foundation (cassandra.apache.org). Other types of 'big data,' scalable databases and/or customized database frameworks can be used within the scope of the technology described herein.

Figure 2:
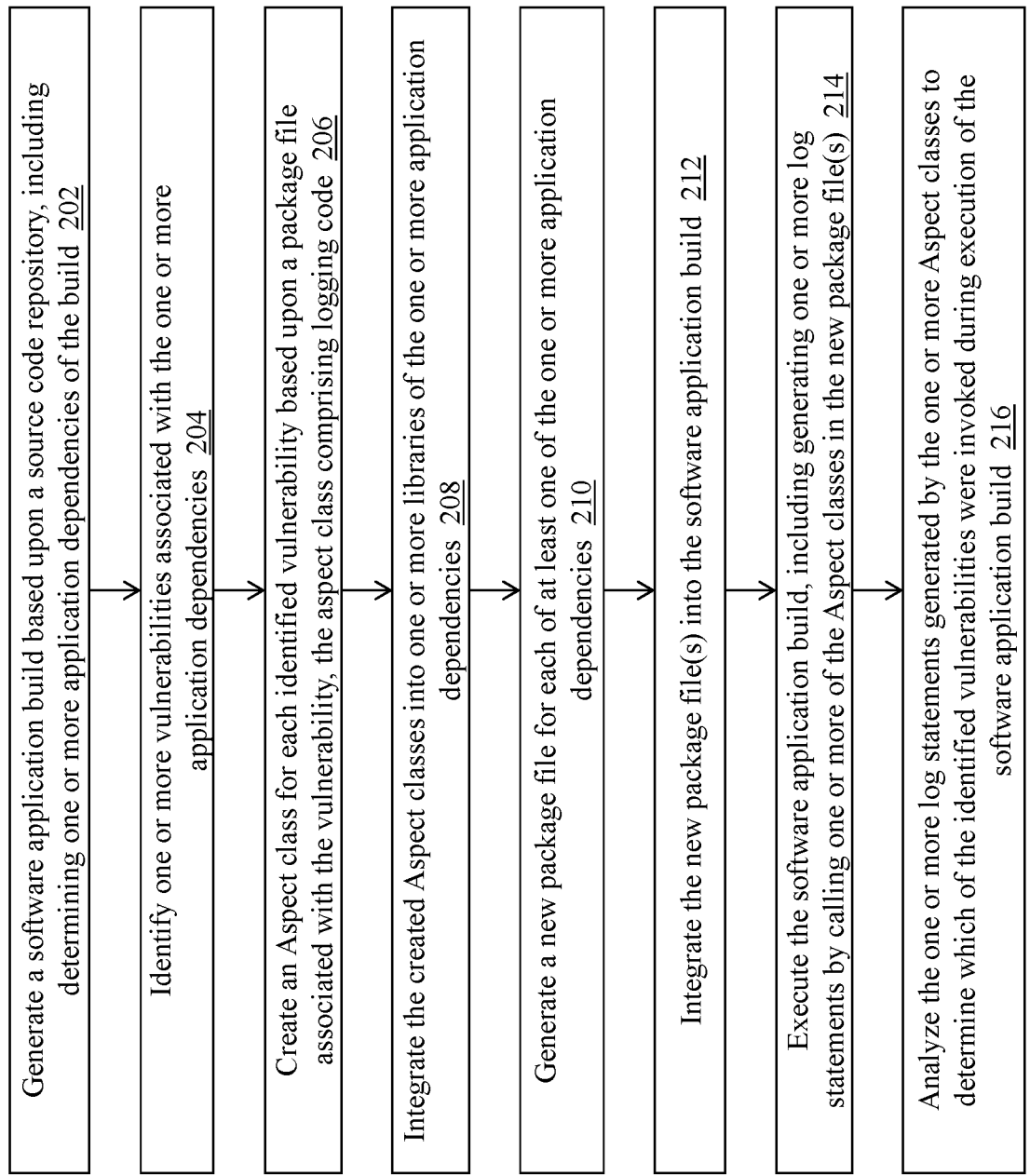
FIG. 2 is a flow diagram of a computerized method of detecting vulnerabilities associated with a software application build.

FIG. 2 is a flow diagram of flow diagram of a computerized method 200 of detecting vulnerabilities associated with a software application build, using the system 100 of FIG. 1. The software build generation module 108a of server computing device 106a, in conjunction with the build server 102, generates (202) a software application build using data retrieved from the source code repository 110c. In one example, at least the source code repository 110c, the software build generation module 108a, and/or the build server 102 can be part of a source code development and management platform that tracks changes in source code and other related files during the development of a software application (e.g., a Java™ application for deployment in a production computing environment), including but not limited to a source code control system and/or a version control system that is coupled to a development environment which enables users to access an application's code base to make changes (e.g., bug fixes, improved and/or additional functionality, and the like). In one embodiment, the server computing device is part of an Apache Maven™ deployment (maven.apache.org); Maven™ is a software project management tool that utilizes the concept of a project object model (POM) to manage a Java™ application build and its related dependencies. It should be appreciated that other types of software project management tools and software development platforms can be used within the scope of the invention. The source code repository 110c can store a build definition file that associates one or more source code files to a particular application build. The software build generation module 108a can use the build definition file to retrieve the necessary components from the source code repository 110c and generate an executable application build for the particular software application.

In most instances, an application build has one or more application dependencies that are required to be integrated into, linked with, or otherwise associated with the application build in order for the software application to function properly. Examples of such application dependencies include, but are not limited to, libraries, frameworks, and other types of modules that contain code, files, and/or functions. An example of an application dependency for a Java™ application is a Java™ Archive (JAR) file. These application dependencies can include open source code and/or third-party licensed code obtained from remote computing devices at build time or stored in the artifact repository 110a for use during application builds. The build definition file and/or the software build generation module 108a can identify the application dependences during the process of generating the software application build and retrieve the necessary dependency components in order to complete generation of the build. In some embodiments, the software build generation module 108a can generate an output file (e.g., POM.xml in Maven™) that stores the determined application dependencies.

Also, during generation of the software application build, the vulnerability identification module 108b identifies (204) one or more vulnerabilities associated with the one or more of the application dependencies described above. For example, as described previously, an application dependency may correspond to open source code and/or third-party code (such as libraries/artifacts stored in artifact repository 110a)—and the dependency may include certain vulnerabilities (e.g., bugs, flaws, etc.) that if left undetected or unremediated, could result in a software application that can be exploited or compromised to gain unauthorized access to backend systems, perform unauthorized functions or transactions, or otherwise negatively impact the stability and/or security of the software application itself or other enterprise computing systems that the application utilizes or with which the application communicates. Therefore, it is important for software application developers to understand whether any vulnerabilities exist in the source code and/or application dependencies to eliminate or minimize the risk of releasing an application that is vulnerable.

The vulnerability identification module 108b can access the enhanced vulnerabilities database 110b to identify whether any vulnerabilities are present in the current software build that is being generated. In some embodiments, the enhanced vulnerabilities database 110b is generated and maintained by the software developers—e.g., as new vulnerabilities with application dependencies are found or detected, the enhanced vulnerabilities database 110b can be updated to include relevant information, such as identity of the application dependency, identity of relevant code classes (e.g., Java™ class names), packages (e.g., JAR files), methods or functions (e.g., Java™ method names), procedure calls, and the like that comprise and/or relate to the vulnerability.

Figure 3:
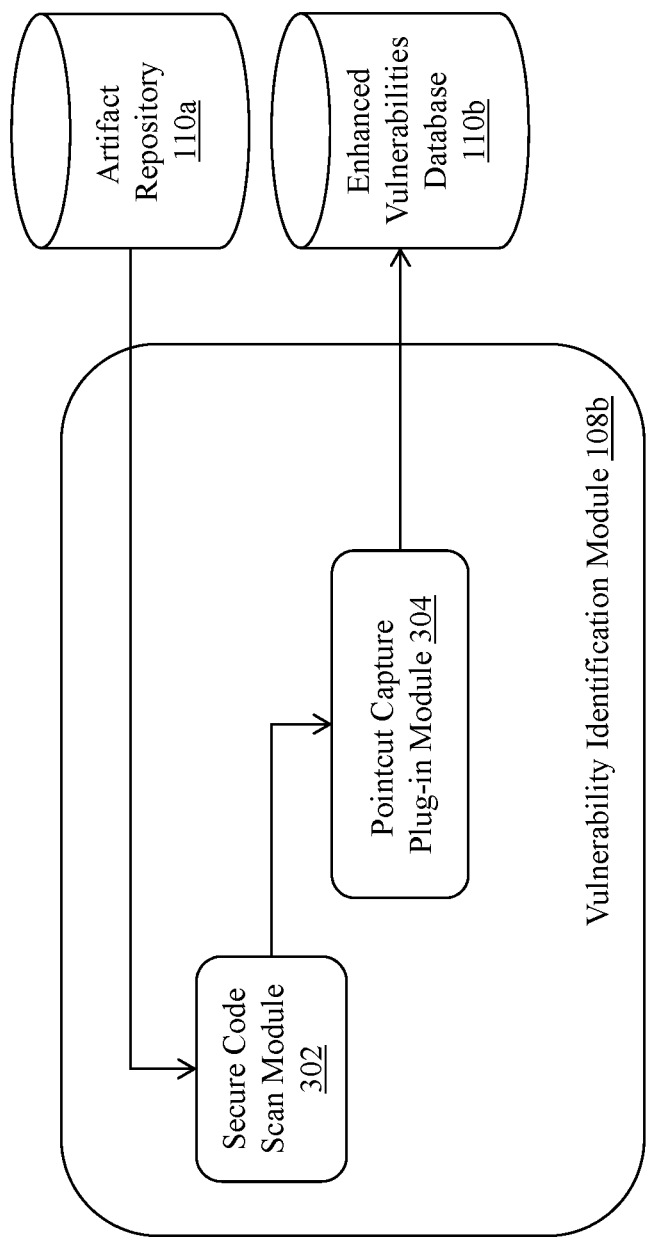
FIG. 3 is a detailed block diagram of the vulnerability identification module of the system of FIG. 1.

FIG. 3 is a detailed block diagram of the vulnerability identification module 108b. As shown in FIG. 3, the vulnerability identification module 108b comprises a secure code scan module 302 and a pointcut capture plug-in module 204. In some embodiments, the modules 302 and 304 are specialized sets of computer software instructions programmed onto a dedicated processor in the server computing device 106a and can include specifically-designated memory locations and/or registers for executing the specialized computer software instructions. The secure code scan module 302 can comprise a process that scans each third-party library/artifact within the artifact repository 110a for known vulnerabilities. In some embodiments, the secure code scan module 302 can rely on external data sources (such as those provided by software security organizations or governmental entities—examples of such data sources are the National Vulnerability Database (NVD) maintained by the National Institute for Standards and Technology (nvd.nist.gov) or the CVE Details data source maintained by MITRE Corp. (www.cvedetails.com)) to retrieve information relating to known vulnerabilities for storage in the enhanced vulnerabilities database 110b. One example of a secure code scan module 302 is VeraCode™ Dynamic Analysis™ available from VERACODE of Burlington, Mass.

The secure code scan module 302 can utilize the pointcut capture plug-in module 304 to create enhanced vulnerability information for storage in the enhanced vulnerabilities database 110b. For example, when the secure code scan module 302 detects a vulnerability, the pointcut capture plug-in module 304 captures information about the artifact (e.g., group id, artifact id and version) that uniquely identifies one or more libraries. Additionally, the information is available to generate a point-cut definition along with information about the vulnerability, including type and severity.

Example information captured by the plug-in module 304 includes, but is not limited to:
 Group ID, Artifact ID, Version;
 Type;
 Severity;
 Location—e.g., can be a combination of package, package and class, or package and class and method.

An example record stored in the enhanced vulnerabilities database 110b is:
 Group_id—org.springframework
 Artifact_id—spring-webmvc
 Version—4.0.0-RELEASE
 Type—CSRF
 Severity—Critical
 Location—org.springframework.web. HttpRequestHandler.handleRequest( . . . )

Turning back to FIG. 2, the vulnerability identification module 108b transmits the information relating to the identified vulnerabilities to the vulnerability strategy advice module 108c. For each identified vulnerability, the module 108c creates (206) an Aspect class (i.e., in AspectJ) based upon a package file associated with the vulnerability, where the Aspect class comprises vulnerability logging code. For example, in a Java™ application, the application dependency may include a package file that contains a plurality of Java™ classes executed by the dependency—and one or more of those classes may comprise a vulnerability. The vulnerability strategy advice module 108c uses the identified vulnerability information to create a corresponding Java™ Aspect class that references the underlying vulnerability.

FIG. 4 is an exemplary Aspect class 400 created by the vulnerability strategy advice module 108c. As shown in FIG. 3, the Aspect class comprises advice code (that is, code that writes data to a log file either before or after the underlying class is called by the application) and a point-cut expression (i.e., @Around("execution(* org.springframework.web.servlet.*( . . . ))")). In this instance, the package 'org.springframework.web.servlet' may contain or be related to a vulnerability, and the point-cut expression enables execution of the advice code (which writes a statement or expression to a log file via the 'WriteToLogFile' method) before and/or after execution of any classes in the 'org.springframework.web.servlet' package. Therefore, when the software application is executed and the point-cut expression is evaluated, the application calls the 'logAroundAllMethods' method and writes to the log file (thereby providing positive confirmation that the software application is invoking code comprising the related vulnerability), then returns to executing the related functionality in the 'org.springframework.web.servlet' package.

Once the Aspect class or classes are created for each vulnerability, the vulnerability strategy advice module 108c integrates (208) the created Aspect classes into one or more libraries of the one or more application dependencies. For example, the vulnerability strategy advice module 108c can perform a post-compile weave (i.e., binary weaving using a program such as AspectJ available at www.eclipse.org/aspectj) to weave one or more Aspect classes into the affected code based upon point-cut information from the enhanced vulnerabilities database 110b so that the created Aspect classes are introduced into the application dependencies (i.e., third party libraries) that may contain the vulnerabilities as identified above. Aspect behavior may be driven by the type or severity of the vulnerability and controlled via application interfaces (e.g., Java™ Management Extensions (JMX)) that allow the behavior to be changed at runtime, as necessary. The resulting application build(s) (i.e., the application build with vulnerability strategies, as shown in FIG. 1) each have some form of strategy handling applied for every known vulnerability and are ready to be deployed to one or more application production environment(s).

The software build generation module 108a then generates (210) a new package file (e.g., a JAR file) for each of at least one of the one or more application dependencies, the package file comprising the libraries with the Aspect class(es), and integrates (212) the new package file(s) into the software application build. For example, using the Maven™ platform, the software build generation module 108a can run a Maven build on the Aspect class(es) to create a JAR file that is then pushed to the artifact repository 110a. The module 108a then modifies a Maven POM file for the software application to include a dependency to the JAR file that contains the Aspect classes. Next, the module 108a runs a Maven build for the software application to create an application WAR or JAR file with the Aspect class(es) bundled in. Now, the software application build includes the Advice code described above (i.e., the application build with vulnerability strategies, as shown in FIG. 1) and can execute the logging functionality to capture when the application calls functions or executes code that may comprise a vulnerability.

The software build generation module 108a then deploys the application build with vulnerability strategies to the application production environment. The server computing device 106b executes (212) a software application 108d using the software application build, including generating one or more vulnerability log statements by calling one or more of the Aspect classes in the new package file(s) that have been included in the application build. In some embodiments, the software build generation module 108a can coordinate with an automated test suite to run a plurality of different use cases for the software application to test a spectrum of application functionality and determine whether log statements are captured—indicating execution of Advice code that corresponds to a potential or actual vulnerability.

Upon completion of the application execution, the alerting module 108e analyzes (216) the one or more log statements generated by the Aspect classes to determine which of the identified vulnerabilities were invoked during execution of the software application build. For example, the alerting module 108e can extract the relevant vulnerability information (e.g., package name, class name, method name, etc.) that is recorded in the log file by the Advice code and parse the relevant vulnerability information to determine, e.g., a particular developer or development group that manages the source code associated with the vulnerability. The alerting module 108e can then generate one or more vulnerability warning messages based upon the log analysis and transmit the vulnerability warning messages to a user device (e.g., client computing device 103) associated with the developer—so that the developer is made aware of the invocation of the vulnerability and if necessary, take steps to remediate the vulnerability. In another example, the alerting module 108e can automatically generate a vulnerability remediation ticket in the corresponding software application development system (e.g., an issue tracking system such as Jira™ from Atlassian, Inc.) that identifies the vulnerability using the relevant information obtained from the log file and assigns the ticket to a developer that can remediate the vulnerability if required.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for detecting vulnerabilities associated with a software application build, the system comprising:
    a server computing device with a memory for storing computer-executable instructions and a processor that executes the computer-executable instructions to:
        generate a software application build based upon a source code repository, including determining one or more application dependencies of the software application build;
        identify one or more vulnerabilities associated with the one or more application dependencies, including:
            generating a vulnerability database comprised of an aggregation of a plurality of software vulnerabilities extracted from two or more different vulnerability data sources,
            scanning source code in the software application build using the vulnerability database to detect one or more vulnerabilities,
            determining characteristics of each detected vulnerability, the characteristics including a group identifier, an artifact identifier, a version number, a type, a severity level, a pointcut definition, and a location in the source code, and
            updating the vulnerability database to include the determined characteristics for each detected vulnerability;
        for each identified vulnerability, create an aspect class based upon a package file associated with the vulnerability, the aspect class comprising vulnerability logging code based upon the pointcut definition for the vulnerability;
        integrate the created aspect classes into one or more libraries of the one or more application dependencies;
        generate a new package file for each of at least one of the one or more application dependencies;
        integrate the new package files into the software application build;
        execute the software application build, including generating one or more log statements by calling one or more of the aspect classes in the new package files; and
        analyze the one or more log statements generated by the one or more aspect classes to determine which of the identified vulnerabilities were invoked during execution of the software application build, including:
            extracting vulnerability information from the one or more log statements,
            parsing the extracted vulnerability information to determine a development entity that manages source code associated with the extracted vulnerability information,
            generating one or more vulnerability warning messages based upon the extracted vulnerability information and the determined development entity, and
            transmitting the vulnerability warning messages to a user device associated with the determined development entity.

2. The system of claim 1, wherein the software application build is a Java application build.

3. The system of claim 1, wherein determining one or more application dependencies of the software application build comprises storing the determined application dependencies in an output file.

4. The system of claim 1, wherein the one or more application dependencies are Java Archive (JAR) files.

5. The system of claim 1, wherein the identified one or more vulnerabilities comprise a file name of a JAR file, a Java class name, a Java method name, or any combination thereof.

6. The system of claim 1, wherein identifying one or more vulnerabilities associated with the one or more application dependencies comprises accessing a remote database to retrieve an identity of one or more of the vulnerabilities.

7. The system of claim 6, wherein the vulnerabilities database is located in a local data store coupled to the server computing device.

8. The system of claim 1, wherein the aspect class is a Java Aspect class and the vulnerability logging code is Advice code.

9. The system of claim 8, wherein the Advice code includes one or more pointcut expressions that each generates a log statement comprising a package name and a method name that contain the Advice code.

10. The system of claim 1, wherein the new package file is a JAR file that includes the created aspect classes.

11. The system of claim 10, wherein integrating the new package file into the software application build comprises:
modifying a build configuration file of the software application build to include the new package file as a dependency to the software application build; and
re-running the software application build using the modified build configuration file to generate an updated software application build that includes the new package file.

12. The system of claim 1, wherein when the server computing device executes the software application build, the generated one or more log statements are transmitted to a remote computing device, which analyzes the one or more log statements generated by the one or more aspect classes.

13. The system of claim 12, wherein the remote computing device generates a vulnerability remediation ticket in a software application development system based upon the analysis of the one or more log statements.

14. A computerized method of detecting vulnerabilities associated with a software application build, the method comprising:
generating, by a server computing device, a software application build based upon a source code repository, including determining one or more application dependencies of the software application build;
identifying, by the server computing device, one or more vulnerabilities associated with the one or more application dependencies, including:
generating a vulnerability database comprised of an aggregation of a plurality of software vulnerabilities extracted from two or more different vulnerability data sources,
scanning source code in the software application build using the vulnerability database to detect one or more vulnerabilities,
determining characteristics of each detected vulnerability, the characteristics including a group identifier, an artifact identifier, a version number, a type, a severity level, a pointcut definition, and a location in the source code, and
updating the vulnerability database to include the determined characteristics for each detected vulnerability;
for each identified vulnerability, creating, by the server computing device, an aspect class based upon a package file associated with the vulnerability, the aspect class comprising vulnerability logging code based upon the pointcut definition for the vulnerability;
integrating, by the server computing device, the created aspect classes into one or more libraries of the one or more application dependencies;
generating, by the server computing device, a new package file for each of at least one of the one or more application dependencies;
integrating, by the server computing device, the new package files into the software application build;
executing, by the server computing device, the software application build, including generating one or more log statements by calling one or more of the aspect classes in the new package files; and
analyzing, by the server computing device, the one or more log statements generated by the one or more aspect classes to determine which of the identified vulnerabilities were invoked during execution of the software application build, including:
extracting vulnerability information from the one or more log statements,
parsing the extracted vulnerability information to determine a development entity that manages source code associated with the extracted vulnerability information,
generating one or more vulnerability warning messages based upon the extracted vulnerability information and the determined development entity, and
transmitting the vulnerability warning messages to a user device associated with the determined development entity.

15. The method of claim 14, wherein the software application build is a Java application build.

16. The method of claim 14, wherein determining one or more application dependencies of the software application build comprises storing the determined application dependencies in an output file.

17. The method of claim 14, wherein the one or more application dependencies are Java Archive (JAR) files.

18. The method of claim 14, wherein the identified one or more vulnerabilities comprise a file name of a JAR file, a Java class name, a Java method name, or any combination thereof.

19. The method of claim 14, wherein identifying one or more vulnerabilities associated with the one or more application dependencies comprises accessing a remote database to retrieve an identity of one or more of the vulnerabilities.

20. The method of claim 19, wherein the vulnerabilities database is located in a local data store coupled to the server computing device.

21. The method of claim 14, wherein the aspect class is a Java Aspect class and the vulnerability logging code is Advice code.

22. The method of claim 21, wherein the Advice code includes one or more pointcut expressions that each generates a log statement comprising a package name and a method name that contain the Advice code.

23. The method of claim 14, wherein the new package file is a JAR file that includes the created aspect classes.

24. The method of claim 23, wherein integrating the new package file into the software application build comprises:
modifying a build configuration file of the software application build to include the new package file as a dependency to the software application build; and
re-running the software application build using the modified build configuration file to generate an updated software application build that includes the new package file.

25. The method of claim 14, wherein when the server computing device executes the software application build, the generated one or more log statements are transmitted to a remote computing device, which analyzes the one or more log statements generated by the one or more aspect classes.

26. The method of claim 25, wherein the remote computing device generates a vulnerability remediation ticket in a software application development system based upon the analysis of the one or more log statements.

* * * * *